W. S. QUIMBY AND F. W. ROBINSON.
METHOD OF BUILDING UP OBJECTS OF QUARTZ GLASS.
APPLICATION FILED NOV. 23, 1918.
1,330,611.
Patented Feb. 10, 1920.
2 SHEETS—SHEET 1.
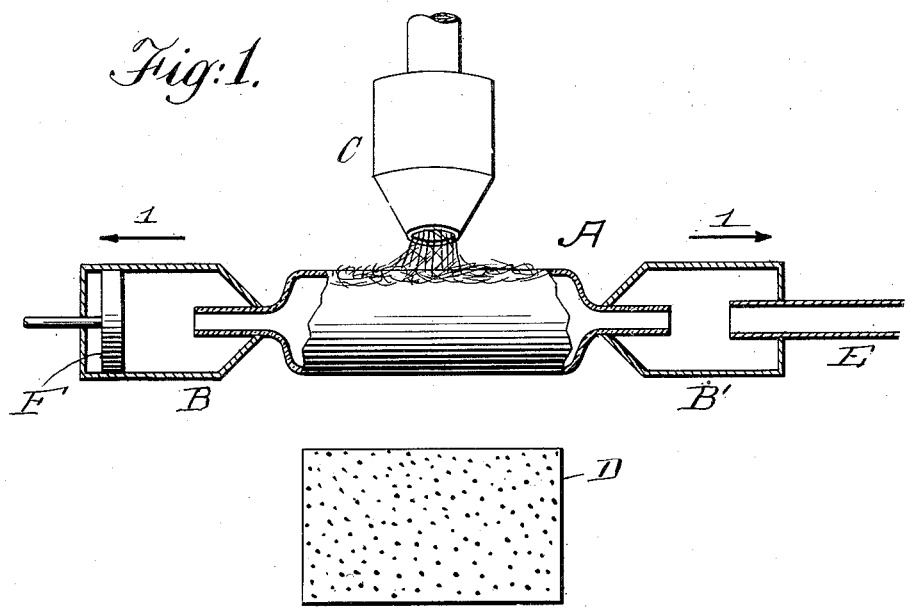
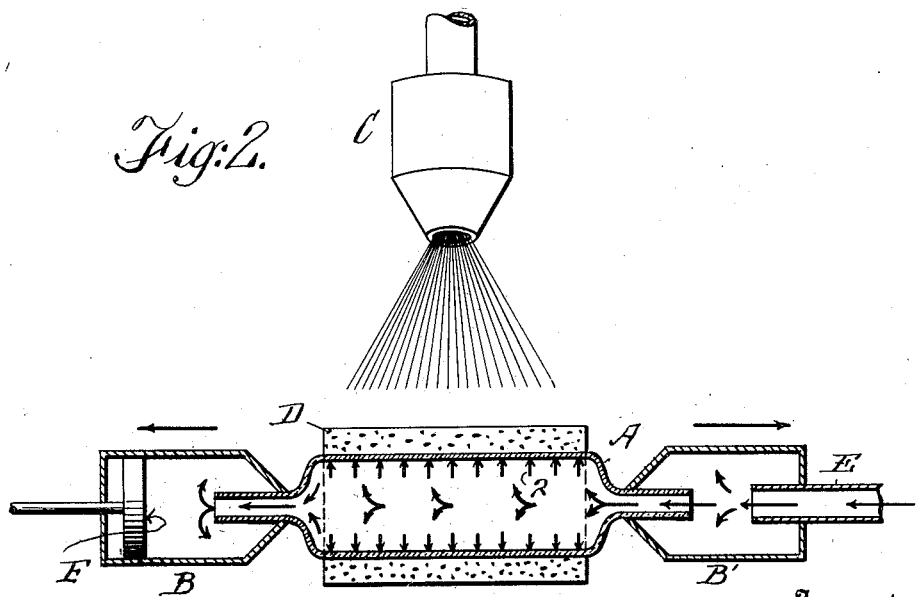

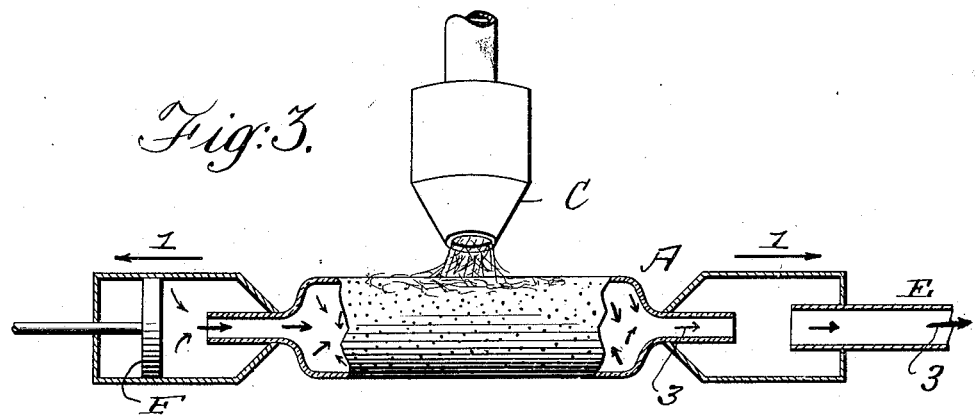
Fig. 3.
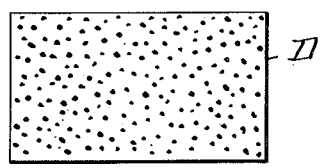
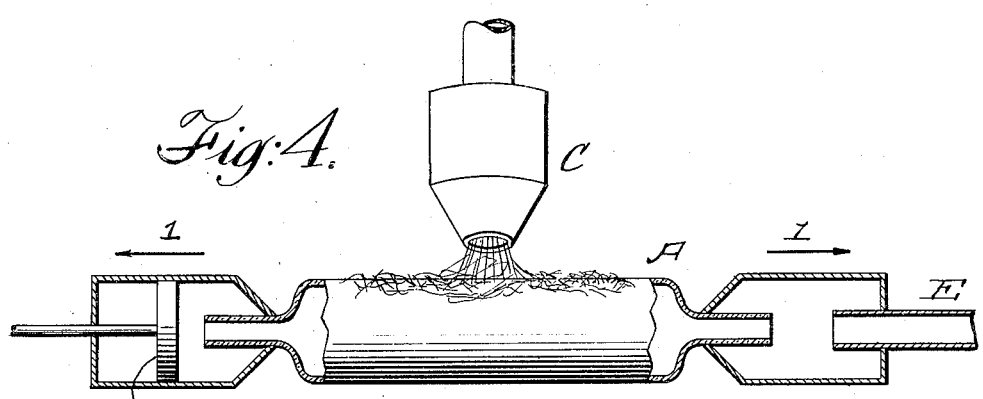
Fig. 4.
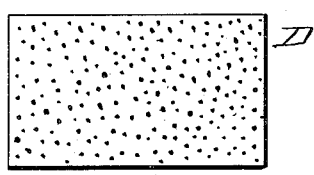

UNITED STATES PATENT OFFICE.

WALKER S. QUIMBY AND FREDERIC W. ROBINSON, OF NEWARK, NEW JERSEY, ASSIGNORS TO HANOVIA CHEMICAL & MANUFACTURING COMPANY, OF NEWARK, NEW JERSEY, A CORPORATION OF NEW JERSEY.

METHOD OF BUILDING UP OBJECTS OF QUARTZ GLASS.

1,330,611.  Specification of Letters Patent.  Patented Feb. 10, 1920.

Application filed November 23, 1918. Serial No. 263,819.

*To all whom it may concern:*

Be it known that we, WALKER S. QUIMBY, a citizen of the United States, and FREDERIC W. ROBINSON, a subject of the King of Great Britain, residing at Newark, in the county of Essex and State of New Jersey, have invented a certain new and useful Improvement in Methods of Building up Objects of Quartz Glass, of which the following is a specification.

The invention is a method of building up an object of quartz glass into predetermined form. Transparent quartz glass (pure fused silica) is used in chemical industries in the shape of rods or tubes. Hitherto these have been produced by simply drawing out a block of quartz glass heated to a plastic condition. This is expensive and involves much skill.

We make the desired object by building it up from quartz powder upon an initial nucleus of quartz glass heated to a plastic state. To this end the heated nucleus is brought into contact with a mass of said quartz powder and preferably rotated therein, so that an accretion of said powder is caused to surround and adhere to said nucleus. The nucleus with its adherent accretion is then reheated, whereby the adherent powder becomes fused and vitrified, and so in the shape of glass becomes incorporated in and an integral part of said nucleus. During this operation the plastic work is elongated, so that the incorporated accretion is made to add to the length thereof. If the object is to be a tube, the initial nucleus is primarily made in tubular form, and in order to prevent thickening or deformation of the wall thereof, the air within said tube is compressed, so that said compressed air forms an internal support for said wall.

In the accompanying drawings—

Figures 1, 2, 3 and 4 are plan views of the tubular object treated, disposed in its tubular holding chucks, the burner for heating said object and the plate which carries the powdered quartz, and generally illustrate the steps of our method.

Similar letters and numbers of reference indicate like parts.

We proceed as follows:

The initial nucleus A of quartz glass, here in tubular shape and having its extremities of reduced diameter, is disposed in suitable chucks B, B' and rotated in the flame from the gas burner C. When said nucleus becomes heated to a plastic state, the burner and hence the heating flame is withdrawn, and a mass of powdered quartz supported on a plate D is moved under the plastic nucleus, as shown in Fig. 2. A quantity of this powder by reason of the softened condition of the nucleus adheres to the surface thereof and, as the nucleus rotates, forms a band around said surface. While the plastic nucleus rotates, its holding chucks B, B' are moved asunder, as indicated by the arrows 1, 1, so that said nucleus is thus elongated. After the accretion of quartz powder has adhered to the nucleus, the plate D carrying the mass of powder is withdrawn and the burner again approximated to the nucleus, as shown in Fig. 3, so that the powder adherent thereon becomes fused and vitrified and so becomes integrally incorporated with the material of said nucleus. The elongation of the work, as before stated, by drawing its ends asunder compensates for the added bulk of powder. That is to say, each successive increment or accretion of quartz powder is fused, vitrified and added to the length of the work. In Fig. 4 the work is shown thus lengthened, as will be seen by comparing its length as shown at A', Fig. 4, with the length of the initial nucleus A in Fig. 1. Said lengthened work then becomes a new nucleus to receive a new accretion of powder. The operation as described is repeated as often as may be desired until by reason of the incorporation of the successive accretions of quartz powder the work is built up to a predetermined length.

Where the nucleus is tubular in form, as here illustrated, it is desirable internally to support the heated and plastic wall thereof. This we preferably accomplish by admitting air under pressure into the hollow nucleus, as indicated by the arrows 2 in Fig. 2— the air current then, for example, entering the hollow chuck B' from a pipe E connected with any suitable source of compressed air and so passing through the chuck B' to the hollow nucleus and then to the opposite hollow chuck B which contains a fixed piston F, whereby said air is prevented from escaping from said chuck and is thus confined in the nucleus. While the nucleus with its adherent quartz powder is being heated to vitrify said powder, as shown in Fig. 3, the compressed air in the nucleus may be allowed to escape therefrom, as indicated by arrows 3, by disconnecting pipe E from the source of compressed air, or in any other suitable way.

Instead of alternately moving the burner and the quartz powder to the work, we may move the work alternately to said burner and said powder. Instead of establishing contact between the work and a mass of quartz powder, as described, we may project the powder upon the heated work in the form of a jet.

By suitably varying the timing of the several steps, the degree of applied heat and the amount of powder accretion, and in the case of hollow work, the degree of internal air pressure, we are able to produce the work in a variety of different shapes—such, for example, as spherical or pear-shaped, or more or less elongated or tapering.

We claim:

1. The method of building up an object of quartz glass, which consists in heating a nucleus of quartz glass to a plastic state, applying to the surface of said nucleus an accretion of powdered quartz, reheating said nucleus and adherent accretion to fuse and vitrify said accretion, and elongating the plastic work to compensate for said accretion.

2. The method of building up a hollow object of quartz glass, which consists in heating a hollow nucleus of quartz glass to a plastic state, applying to the surface of said nucleus an accretion of powdered quartz, increasing the air pressure within said nucleus during said application, and reheating said nucleus and adherent accretion to fuse and vitrify said accretion.

In testimony whereof we have affixed our signatures in presence of two witnesses.

WALKER S. QUIMBY.
FREDERIC W. ROBINSON.

Witnesses:
GERTRUDE T. PORTER,
MAY T. MCGARRY.